(12) United States Patent
Thompson

(10) Patent No.: US 9,266,612 B2
(45) Date of Patent: Feb. 23, 2016

(54) MOLDED SPREADER FOR AN AIRCRAFT GATEBOX

(71) Applicant: Larry D. Thompson, Iowa Park, TX (US)

(72) Inventor: Larry D. Thompson, Iowa Park, TX (US)

(73) Assignee: Texas Transland LLC, Wichita Falls, TX (US)

( * ) Notice: Subject to any disclaimer, the term of this patent is extended or adjusted under 35 U.S.C. 154(b) by 611 days.

(21) Appl. No.: 13/685,145

(22) Filed: Nov. 26, 2012

(65) Prior Publication Data

US 2014/0145007 A1 May 29, 2014

(51) Int. Cl.
| | | |
|---|---|---|
| B05B 1/18 | (2006.01) | |
| B64D 1/16 | (2006.01) | |
| B05B 1/04 | (2006.01) | |
| B05B 1/14 | (2006.01) | |
| B05B 1/26 | (2006.01) | |
| B64D 1/18 | (2006.01) | |
| B05B 1/28 | (2006.01) | |
| A01C 15/00 | (2006.01) | |

(52) U.S. Cl.
CPC . *B64D 1/16* (2013.01); *A01C 15/00* (2013.01); *B05B 1/04* (2013.01); *B05B 1/042* (2013.01); *B05B 1/14* (2013.01); *B05B 1/262* (2013.01); *B05B 1/28* (2013.01); *B64D 1/18* (2013.01)

(58) Field of Classification Search
CPC ............ B05B 1/14; B05B 1/04; B05B 1/042; B05B 1/28; B05B 1/262; B64D 1/16; B64D 1/18; A01C 15/00; A62C 3/0228
USPC .............. 239/171, 499, 502, 590.5, 597, 598, 239/650, 654, 663; 244/136; 169/53
See application file for complete search history.

(56) References Cited

U.S. PATENT DOCUMENTS

| | | | | |
|---|---|---|---|---|
| 3,107,616 | A | | 10/1963 | Boaz et al. |
| 3,423,053 | A | | 1/1969 | Hawkshaw |
| 3,476,337 | A | * | 11/1969 | Cornett, Jr. .................... 244/136 |
| 3,777,978 | A | * | 12/1973 | Manicatide et al. .......... 239/171 |
| 3,860,202 | A | | 1/1975 | Johnson |
| 4,172,499 | A | | 10/1979 | Richardson et al. |
| 4,382,568 | A | * | 5/1983 | Schertz ......................... 244/136 |
| 4,694,991 | A | * | 9/1987 | Breckenridge ............... 239/171 |
| 5,148,989 | A | | 9/1992 | Skinner |
| 5,279,481 | A | | 1/1994 | Trotter et al. |
| 5,451,016 | A | | 9/1995 | Foy et al. |
| 5,722,591 | A | | 3/1998 | Folger |
| 6,003,782 | A | | 12/1999 | Kim et al. |

OTHER PUBLICATIONS

Dennis R. Gardisser et al., "Agricultural Aircraft Spreader Setup,", MP 351-2M6-93, *Cooperative Extension Service, University of Arkansas, U.S. Department of Agriculture*, Date Unknown, 11 pages.
U.S. Appl. No. 13/685,084, entitled, "Sliding Door Gatebox and Detachable Seeder Plate," filed Nov. 26, 2012, 32 pages.
U.S. Patent and Trademark Office Official Action in U.S. Appl. No. 13/685,084 dated Jun. 30, 2015, 10 pages.

* cited by examiner

*Primary Examiner* — Steven J Ganey
(74) *Attorney, Agent, or Firm* — Baker Botts L.L.P.

(57) ABSTRACT

A spreader for an aircraft comprises a throat assembly operable to couple to a gatebox, the throat assembly comprising an air intake portion operable to direct airflow into the spreader, a material intake portion operable to receive material released from a gatebox, a fan assembly comprising a plurality of vanes that divide the fan assembly into a plurality of compartments, wherein the vanes are comprised of molded material, and a connection mechanism operable to couple the fan assembly to the throat assembly.

20 Claims, 7 Drawing Sheets

MOLDED SPREADER FOR AN AIRCRAFT GATEBOX

TECHNICAL FIELD OF THE INVENTION

This invention relates generally to the field of spreading material from an aircraft, and more specifically to a spreader for an aircraft gatebox.

BACKGROUND OF THE INVENTION

Aircraft are often used to spread material over a surface, for example, in agricultural, firefighting, forest seeding, and other applications. In traditional spreading systems, a gatebox stores the flow of material from an aircraft. Spreading systems may include a spreader that connects to a gatebox and controls the spread pattern of material that flows out of the gatebox. In some spreading systems, the spreader is made from sheet metal riveted together. A spreader generally has a narrow front (direction of flight) end that captures airflow and fans out to a wide rear end where the airflow exits the spreader. A spreader may include a number of vanes that divide the spreader into sections. In certain systems, material flows from the gatebox into the spreader at the narrow end. The material is conveyed by the captured airflow through the vanes to the wide rear end where the material exits the spreader in a widened pattern.

SUMMARY OF THE INVENTION

A spreader for an aircraft comprises a throat assembly operable to couple to a gatebox, the throat assembly comprising an air intake portion operable to direct airflow into the spreader, a material intake portion operable to receive material released from a gatebox, a fan assembly comprising a plurality of vanes that divide the fan assembly into a plurality of compartments, wherein the vanes are comprised of molded material, and a connection mechanism operable to couple the fan assembly to the throat assembly.

Certain embodiments of the present disclosure may include some, all, or none of the following advantages. One or more other technical advantages may be readily apparent to those skilled in the art from the figures, descriptions, and claims included herein.

In an embodiment, a spreader comprising a molded plastic body weighs less than existing sheet metal spreaders, thereby reducing the weight required for an aircraft to carry a spreader and reducing the resources required to attach or remove a spreader.

In another embodiment, a spreader comprising curved molded vanes prevents the build up of material, thereby preventing disruption of the spread pattern caused by obstructed vanes.

In yet another embodiment, a spreader with a detachable plate allows the vanes of the spreader to be maintained and repaired.

In still yet another embodiment, a spreader comprises a fan assembly that detachably connects to a throat assembly, thereby allowing different fan assemblies with different vane numbers, compositions, and spread patterns to be connected to a throat assembly of a spreader.

In a further embodiment, a spreader comprises adjustment mechanisms that change the angle of the spreader with respect to a gatebox, thereby allowing greater control over the spread pattern, prevention of buildup of material along the bottom of an aircraft, and reduction in the effect of abrasive wear from material impacting the aircraft.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
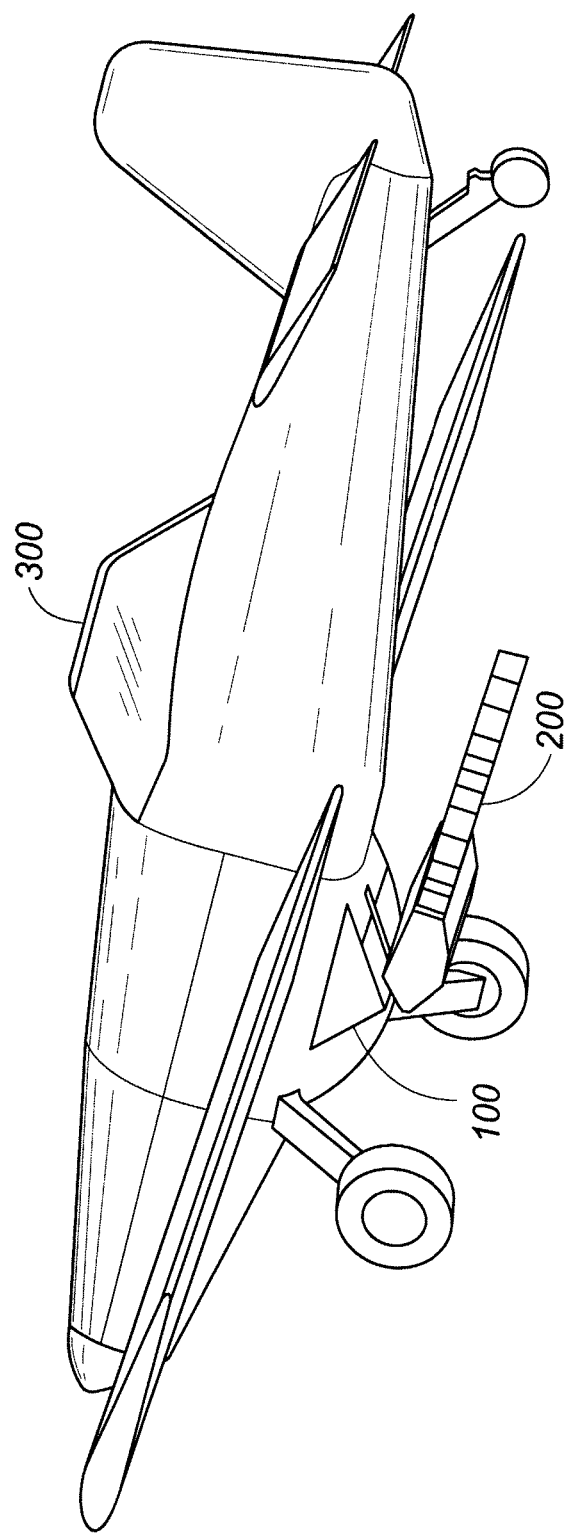
FIG. 1 is an illustration of an embodiment of a system for spreading material from an aircraft.

Embodiments of the present invention and its advantages are best understood by referring to FIGS. 1 through 6 of the drawings, like numerals being used for like and corresponding parts of the various drawings.

Aircraft can facilitate spreading a variety of materials over a surface in industries such as agriculture (e.g., seed, insecticide, fertilizer, or herbicide), firefighting (e.g., water or fire suppressant), forestry (e.g., tree planting or regeneration), disease control (e.g., spraying insecticide or other treatment to control disease outbreaks), or any other suitable application that spreads a material over a large surface area. In traditional systems, aircraft release material from a gatebox connected to the aircraft. The gatebox holds the material and controls the flow of material out of the gatebox into a spreader which controls the distribution pattern of the material. A traditional gatebox may include an opening through which material can flow out of the gatebox into a spreader, a hopper that holds material and directs it to the opening, and one or two doors positioned on hinges that control the flow of material out of the opening of the gatebox into a spreader. In traditional applications, a hinged door opens into a spreader and obstructs the airflow around the aircraft and the airflow through the spreader. The obstructed airflow around the aircraft creates drag on the aircraft, increases the load on the door and the components of the gatebox that hold the door open, and generates turbulence around the aircraft that interferes with the dispersion pattern of material released from the gatebox. Additionally, the hinged door can restrict airflow through the spreader interferes with the dispersion pattern of material released from the gatebox. In the event of an emergency jettison of material from the gatebox, the hinged door may restrict airflow through the spreader, thereby limiting the rate at which material can exit the gatebox and reducing the effectiveness of the gatebox to quickly unload the aircraft hopper. With existing gateboxes, a seeder plate may connect over an opening of the gatebox to restrict the flow of material out of the gatebox. Traditional seeder plates are after market additions that connect to the gatebox opening using a number of bolts and are not specially designed for a particular gatebox.

In some existing systems, a gatebox is connected to a spreader that controls the distribution pattern of material flowing out of the gatebox. Traditional spreaders include a number of vanes that direct material through the spreader and are generally comprised of sheet metal that is riveted together resulting in squared corners in the vanes. Airflow through the spreader causes the material to travel along the upper skin of the spreader where it is forced into the square corners, resulting in defined ropes of material to be ejected from each of the spreader's vanes. This rope effect may cause uneven coverage of material when distributed over a surface. Additionally, sheet metal spreaders often develop fractures and cracks that are costly to repair.

In an embodiment of the present disclosure, a system for spreading material from an aircraft comprises a sliding door gatebox. In an example, a sliding door gatebox includes a hopper, one or more openings, one or more sliding doors, and one or more door seals. The hopper portion may be operable to store the material that is to be spread and to direct the material to the one or more openings of the gatebox. In certain embodiments, material flow from the one or more openings is controlled by one or more sliding doors. The one or more sliding doors may move between one or more different open positions, which allow different amounts of material to flow from the gatebox out of the opening, and a closed position, which prevents material from flowing out of the opening. In an embodiment, the one or more door seals are operable to engage one or more sides of the sliding doors to prevent material from escaping along the engaged sides of the doors. The one or more door seals may be operable to generate a liquid tight seal, thereby allowing the gatebox to hold wet or dry material for spreading. In certain embodiments, a seeder plate detachably connects to gatebox with spring pins or any suitable quick release mechanism. The seeder plate may detachably connect to the gatebox through a door of the gatebox, thereby allowing for the seeder plate to be connected without removing the gatebox from an aircraft.

In an embodiment, a system for spreading material from an aircraft comprises a molded spreader. A spreader may intake airflow through a narrow front end and direct the airflow through vanes that fan out to a wider rear end. In certain embodiments, a spreader receives material from a gatebox in the narrow front end and introduces the material to the airflow in the vanes of the spreader where the material is carried by the airflow out of the spreader in a particular spread pattern. A molded spreader may be made from molded plastic or other moldable material (e.g., polymer, or fiberglass), which may reduce the weight of the spreader compared to sheet metal spreaders. In an embodiment, the molded design allows the spreader to have smooth curves that reduces or eliminates corners in spreader vanes. The molded design may further modify the aerodynamic performance of the spreader allowing for different performance profiles.

A spreader may comprise a throat assembly and a fan assembly. In an embodiment, the throat assembly is operable to connect to a gatebox and a fan assembly. The throat assembly may connect to a gatebox by a quick release mechanism such as over-center latches and may connect to the fan assembly by an attachment mechanism such as locking bolts. In certain embodiments, a throat assembly may connect to a plurality of different fan assemblies that may have different shapes, compositions, vane numbers, spread patterns, aerodynamic performance profiles, or other properties. A spreader may include one or more adjustment mechanisms, such as pivot bolts, to adjust the angle of the spreader (or fan assembly of the spreader) with respect to the body of the aircraft. The distribution pattern of material can be tuned by adjusting the angle of the spreader. In certain embodiments, adjusting the angle of the spreader can avoid buildup of material on the surface of the aircraft and abrasive wear from the impact of material on the surface of the aircraft. A spreader may include a detachable plate that allows the vanes to be easily maintained and repaired.

FIG. 1 is an illustration of an embodiment of a system for spreading material from an aircraft 300. The system of FIG. 1 may include sliding door gatebox 100, molded spreader 200, and aircraft 300. Sliding door gatebox 100 connects to aircraft 300. Sliding door gatebox 100 holds any suitable material for spreading and regulates the flow of material out of gatebox 100 using one or more sliding doors. Sliding door gatebox 100 is described in more detail below with respect to FIGS. 2-3.

In certain embodiments, a molded spreader 200 connects to a gatebox (e.g., sliding door gatebox 100). Molded spreader 200 controls the distribution pattern of material released from sliding door gatebox 100. In an embodiment, molded spreader 200 receives material released from sliding door gatebox 100 and introduces the material to airflow captured by molded spreader 200. The airflow transports the material through vanes of molded spreader 100 that control the distribution pattern of material out of spreader 200. Molded spreader 200 is described in more detail below with respect to FIGS. 5-6.

Modifications, additions, or omissions may be made to the system of FIG. 1. The system may include more, fewer, or other components. Any suitable type of gatebox or spreader may be used. For example molded spreader 100 may be used with a non-sliding door gatebox or sliding door gatebox 100. Similarly, sliding door gatebox 100 may be used with non-molded spreaders or molded spreader 200. In the illustrated embodiment, aircraft 300 is an airplane, however, in other embodiments, aircraft 300 may be a helicopter or any other vehicle capable of powered flight.

Figure 2:
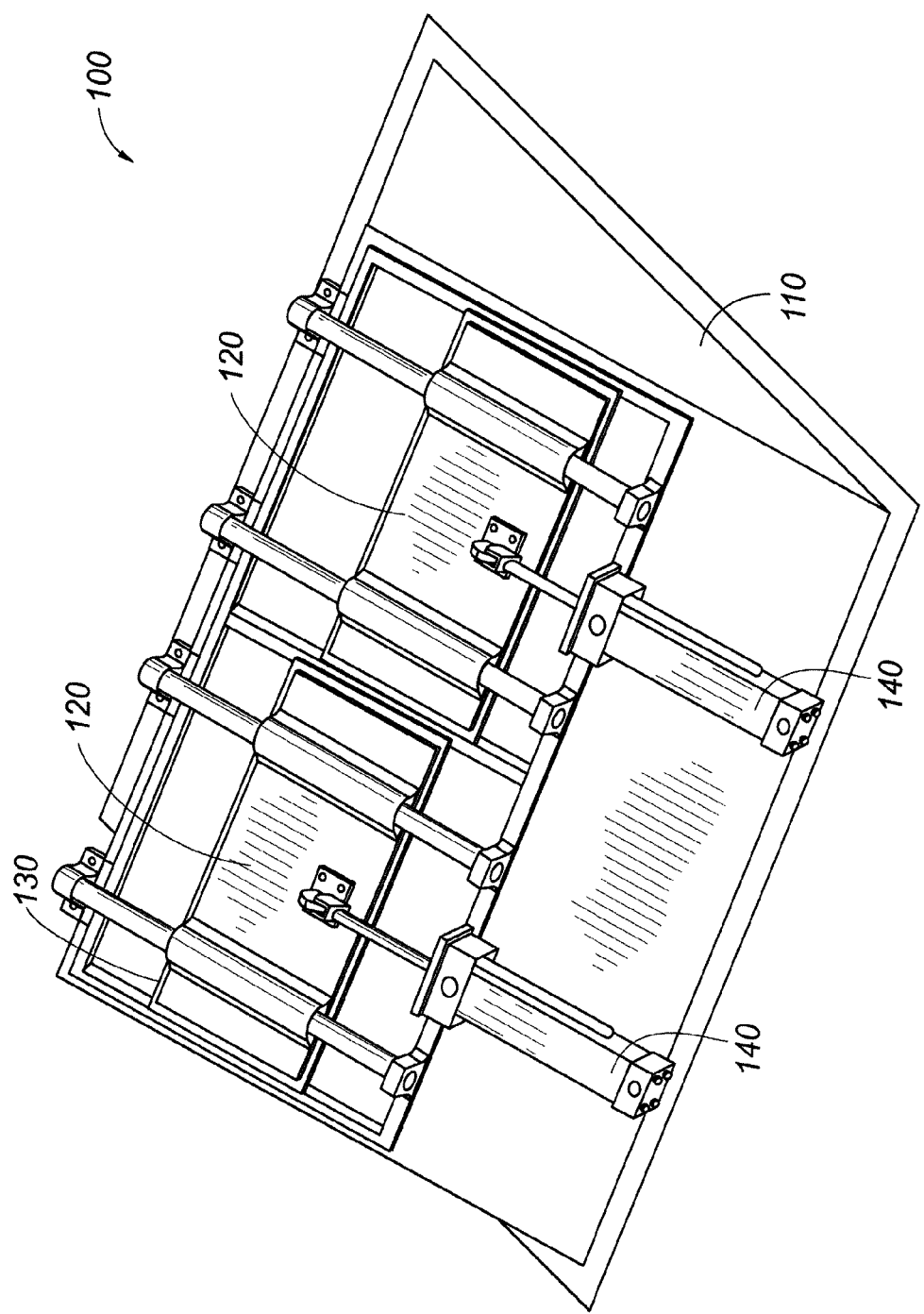
FIG. 2 is an illustration of an embodiment of a sliding door gatebox.

FIG. 2 is an illustration of an embodiment of a sliding door gatebox 100. Sliding door gatebox 100 may include one or more of hopper 110, sliding doors 120, door seals 130, and door actuators 140. Sliding door gatebox 100 regulates the flow of material for spreading in various applications.

In an embodiment, hopper 110 holds material for sliding door gatebox 100 and directs the material to one or more sliding doors 120 of sliding door gatebox 100. Hopper 110 may be of any size supportable by aircraft 300 and may hold any type of spreading material. In an embodiment, hopper 110 is operable to hold wet or dry materials for spreading. Hopper 110 may connect aircraft 300 in any suitable fashion and may be comprised of any suitable material.

In an embodiment, sliding door gatebox 100 includes one or more sliding doors 120 operable to regulate the flow of material out of one or more openings of sliding door gatebox 100. The openings of sliding door gatebox 100 are described below with respect to FIGS. 3-4. Sliding door gatebox 100 may include any suitable number of doors in any suitable configuration. For example, sliding doors 120 may open along an axis that runs parallel to the fuselage of aircraft 300 when gatebox 100 is connected to aircraft 300, or may open along an axis that runs perpendicular to the fuselage of aircraft 300 when gatebox 100 is connected to aircraft 300. Sliding doors 120 may open in the same or different directions and may open independently of, or in combination with, other siding doors 120.

In certain embodiments, sliding doors 120 comprise rear edge 124, front edge 122, and side edges 123. Rear edge 124 may be wider than front edge 122, and side edges 123 may taper from rear edge 124 to front edge 122. In an embodiment, tapered side edges 123 reduce contact between tapered side edges 123 and seal 130 (e.g., seal sides 134) while sliding door 120 is moving, but facilitate a liquid tight seal when sliding doors 120 are in the closed position. For example, when sliding door 120 is in a closed position, all sides of door seal 130 may engage all edges of sliding door 120 such that a barrier is formed through which material (e.g., solid or liquid material) cannot pass. When sliding door 120 is moving to an open position, tapered side edges 123 may separate from door seal 130. In certain embodiments, tapered side edges 123 taper from wider rear edge 124 to narrower front edge 122 at an angle of 1°, however, side edges 123 may taper at any angle between 0°-45°. Sliding doors 120 may include a lipped edge, for example, rear edge 124 of sliding doors 120. In certain embodiments, the lipped edge may engage a lipped portion of door seal 130 to generate a seal along the lipped edge of sliding doors 120. Sliding doors 120 are described in more detail below with respect to FIG. 3.

One or more door seals 130 create a seal between gatebox 110 and one or more sliding doors 120. In certain embodiments, one or more door seals 130 are elastomeric compressible seals that are operable to create a liquid (e.g., water) tight seal. Door seals 130 may be comprised of any suitable material and may generate a seal in any suitable fashion. In certain embodiments, the number and configuration of door seals 130 depend on the number of openings in sliding door gatebox 100 and the number of sliding doors 120 in sliding door gatebox 100. For example, multiple sliding doors 120 controlling a single opening may have a different number and configuration of door seals 130 than multiple sliding doors 120 controlling multiple openings. In an embodiment, door seals 130 may be affixed to sliding doors 120 to generate a seal between neighboring sliding doors 120. Door seals 130 may be operable to engage the sides of sliding doors 120 to generate a seal. In an embodiment, door seals 130 engage edges of sliding doors 120 and compress to generate a liquid tight seal. Door seals 130 may include a lipped edge corresponding to the lipped edge of sliding doors 120. In certain embodiments, the lipped edge of door seals 130 engages the lipped edge of sliding doors 120 to generate a liquid tight seal. Door seals 130 are described in more detail below with respect to FIG. 3.

One or more door actuators 140 move one or more sliding doors 120 from a closed position to one or more open positions operable to allow material to flow out of gatebox 110 through an opening. Door actuators 140 represent any component operable to move one or more sliding doors 120 between open and closed positions. In certain embodiments, door actuators 140 are linear actuators. Door actuators 140 may each control a single sliding door 120, multiple sliding doors 120, or multiple door actuators 140 may control a single sliding door 120. In an embodiment, door actuators 140 are operable to open one or more sliding doors 120 by various amounts. Opening sliding doors 120 to different open positions provides additional control over the flow of material from gatebox 100. Door actuators 140 can be independently controlled or controlled as a group of two or more. In certain embodiments, door actuators are operable to exert enough closing force to push the edges of sliding door 120 into door seal 130 such that a seal is generated between sliding door 120 and door seal 130. Because door actuators 140 do not open sliding doors 120 on hinges, they do not need to support the forces involved in opening a gate door positioned on hinges into the airflow under aircraft 300 or closing against the load of material exiting gatebox 100. As such, door actuators 140 may be comprised of lighter materials than those used by doors operating on hinges, thereby reducing the weight of sliding door gatebox 100.

Modifications, additions, or omissions may be made to gatebox 100. Gatebox 100 may include more, fewer, or other components. Gatebox 100 may include any suitable number or combination of sliding doors 120, door seals 130, and door actuators 140.

Figure 3:
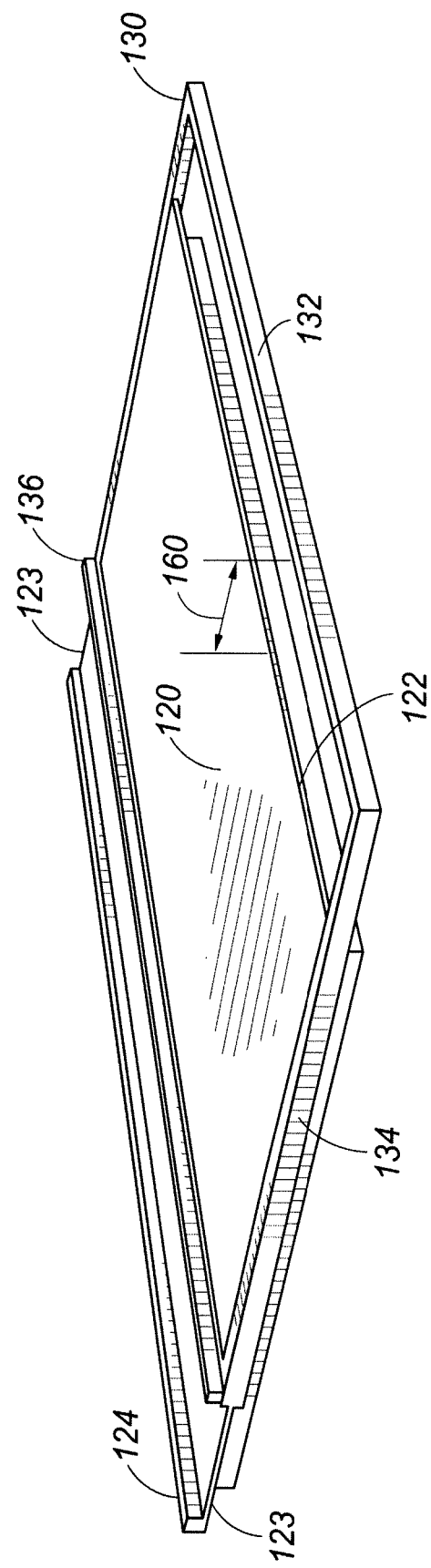
FIG. 3 is an illustration of an embodiment of a sliding door and door seal of a sliding door gatebox.

FIG. 3 is an illustration of an embodiment of a sliding door 120 and door seal 130 of a sliding door gatebox 100. The configuration of door seal 130 on sliding door 120 facilitates a liquid tight seal.

Sliding door 120 may include one or more of front edge 122, side edges 123, and rear edge 124. In certain embodiments, sliding door 120 is a trapezoidal shape. For example, rear edge 124 may be wider than front edge 122 and side edges 123 may taper from rear edge 124 to front edge 122. In the closed position, sliding door 120 edges 122, 123, and 124 engage and compress door seal 130 to form a liquid tight seal. When sliding door 120 moves from the closed position to an open position, front edge 122 and rear edge 124 pull away from door seal 130 sides 132 and 136 respectively because sliding door 120 is moving away from those sides of door seal 130, while tapered edges 123 pull away from the seal because of the tapered angle.

In an embodiment, seal 130 includes lipped side 136 corresponding to lipped edge 124 of sliding door 120. Seal 130 may have a shape corresponding to the shape of sliding door 120. For example, sides 134 of door seal 130 may taper at an angle similar to side edges 123 of sliding door 120. In certain embodiments, door seal 130 is wider at rear side 136 than front side 132 and door seal sides 134 taper from wider rear side 136 to narrower front side 132. Door seal 130 may include a groove on sides 132 and 134 that receive sliding door 120. In certain embodiments, the angle of taper of sides 134 may increase from rear side 136 to front side 132. For example, the angle of taper of sides 134 may be 1° at rear side 136 and 2° at front side 132. Seal 130 may comprise any suitable material operable to generate a barrier when engaged by sliding door 120, for example, compressible materials such as rubber, foam, plastic, or any other suitable seal material.

When front edge 122 of sliding door 120 is not engaged with front 132 of door seal 130, an opening 160 exists through which material can flow from gatebox 100. As sliding door 120 closes, the front edge 122 of sliding door 120 engages front side 132 of seal 130 and rear lipped edge 124 of sliding door 120 engages rear lipped side 136 of door seal 130 to generate a seal between the front and rear edges of sliding door 120 and front and rear sides 132 and 136 of door seal 130. In certain embodiments, the top portion of sliding door 120 may also engage the bottom portion of lipped side 136 of door seal 130 to generate a seal along the lipped side 136 of door seal 130 when sliding door 120 is in an open position and lipped edge 124 of sliding door 120 is not engaged with lipped side 136 of door seal 130.

Modifications, additions, or omissions may be made to sliding door 120 or door seal 130. Sliding door 120 or door seal 130 may include more, fewer, or other components.

Figure 4:
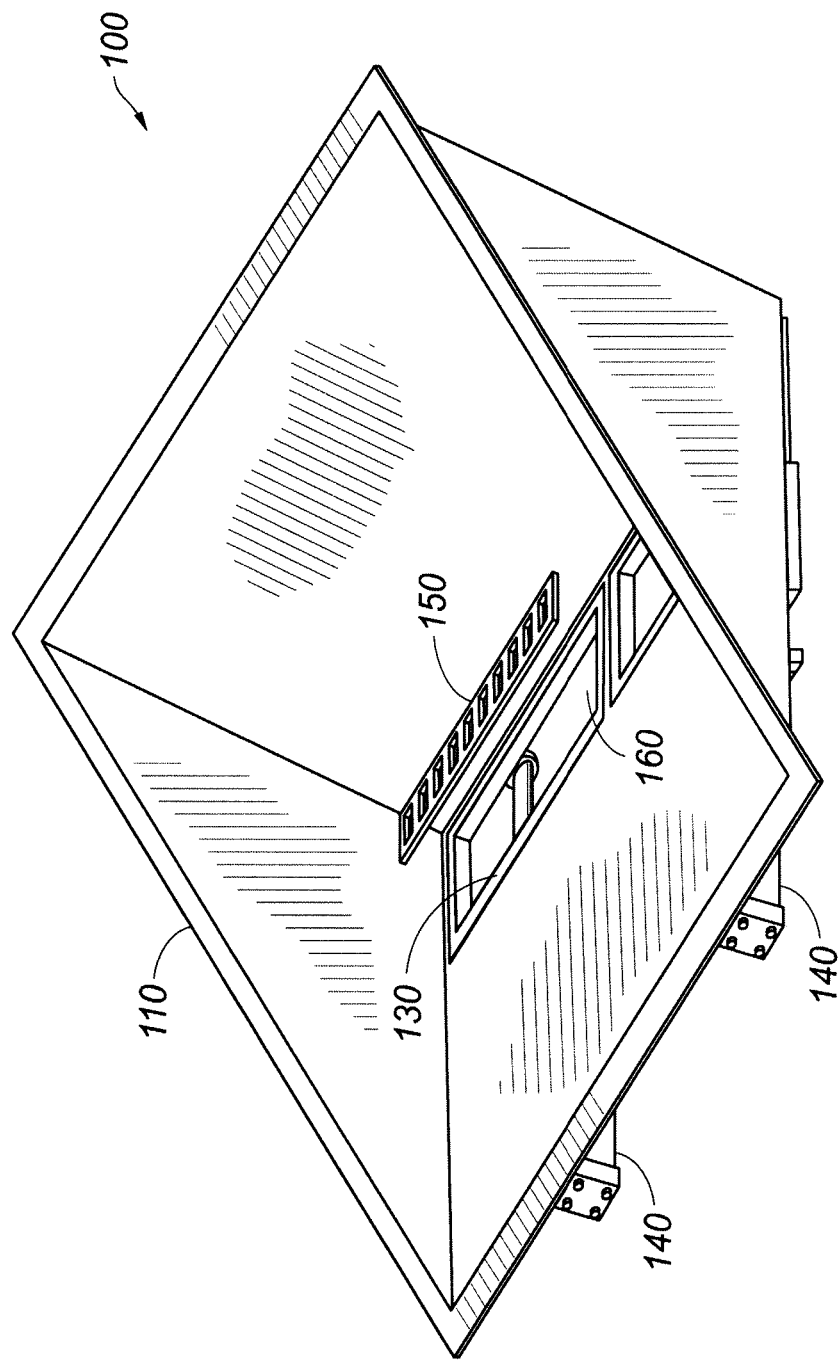
FIG. 4 is an illustration of an embodiment of a detachable seeder plate for a gatebox.

FIG. 4 is an illustration of an embodiment of a detachable seeder plate 150 for gatebox 100. In an embodiment, one or more detachable seeder plates 150 are positioned over one or more openings 160 of gatebox 100. Detachable seeder plate 150 may comprise a plate with a number of openings operable to reduce the flow rate of material out of gatebox 100 through one or more openings 160. In certain embodiments, detachable seeder plate 150 connects to gatebox 100 using a quick release mechanism, for example, spring pins. Detachable seeder plate 150 may be connected to gatebox 100 through door 120 or opening 160 of gatebox 100, thereby allowing installation without removing gatebox 100 from aircraft 300. For example, a user can install seeder plate 150 by opening sliding door 120 of gatebox 100 and connecting seeder plate 150 to gatebox 100 over opening 160 using spring pins or other quick release mechanism.

Modifications, additions, or omissions may be made to seeder plate 150. Seeder plate 150 may include more, fewer, or other components. Seeder plate 150 may connect to gatebox 100 in any suitable fashion (e.g., bolts, screws, fasteners, clips, latches, magnets, etc). Any suitable number of seeder plates 150 may connect to gatebox 100, and the number of seeder plates 150 may depend on the number of openings 160 in gatebox 100. For example, if gatebox 100 has two openings 160, a seeder plate 150 may be placed in each opening 160. Seeder plate 150 may include any number of openings of any suitable size. The number and size of the openings may depend on material and desired flow rate. For example, a seeder plate 150 with small openings will reduce the rate material can flow through an opening 160 covered by seeder plate 150. Larger openings in seeder plate 150 allow a higher rate of material to flow through opening 160. In certain embodiments, the size of the openings in seeder plate 150 is based on the spreading material. For example, a seeder plate 150 used with a material with a large particle size will have openings large enough to accommodate the large particle size. Seeder plate 150 may be used with any suitable gatebox, for example, siding door gatebox 100 or a non-sliding door gatebox.

Figure 5A:
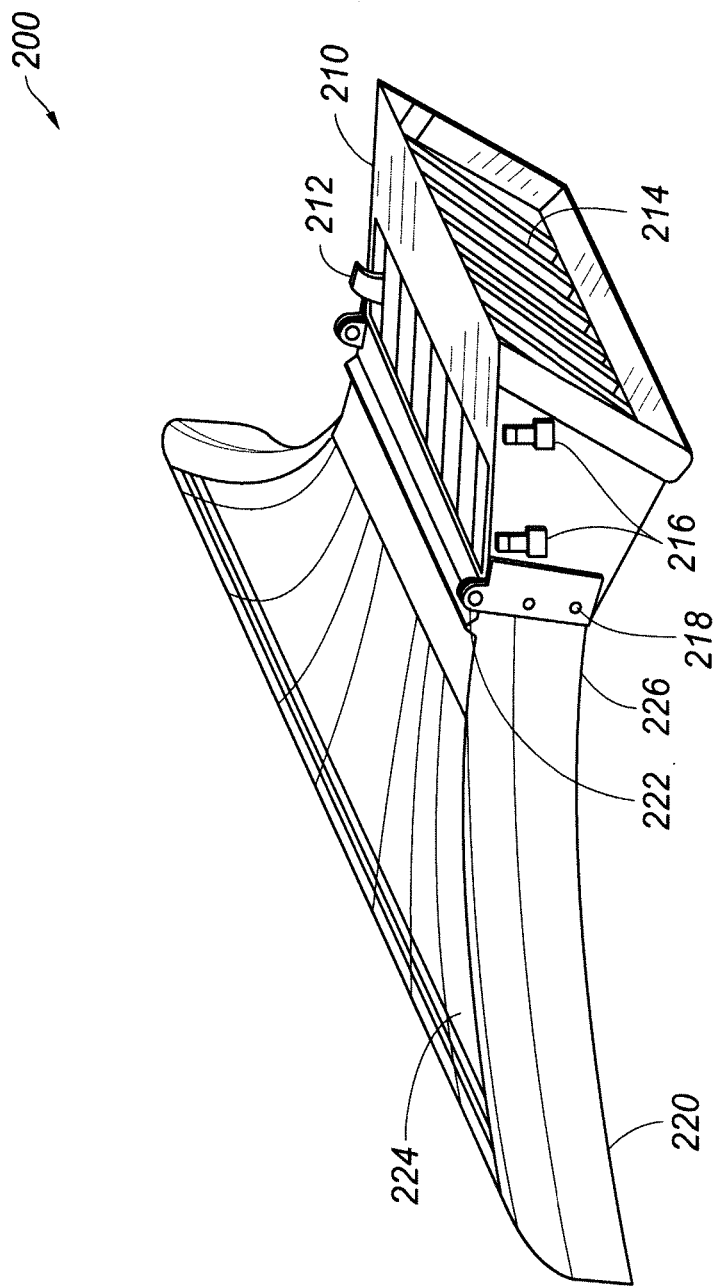
FIGS. 5A-B are illustrations of an embodiment of a spreader for a gatebox.
Figure 5B:
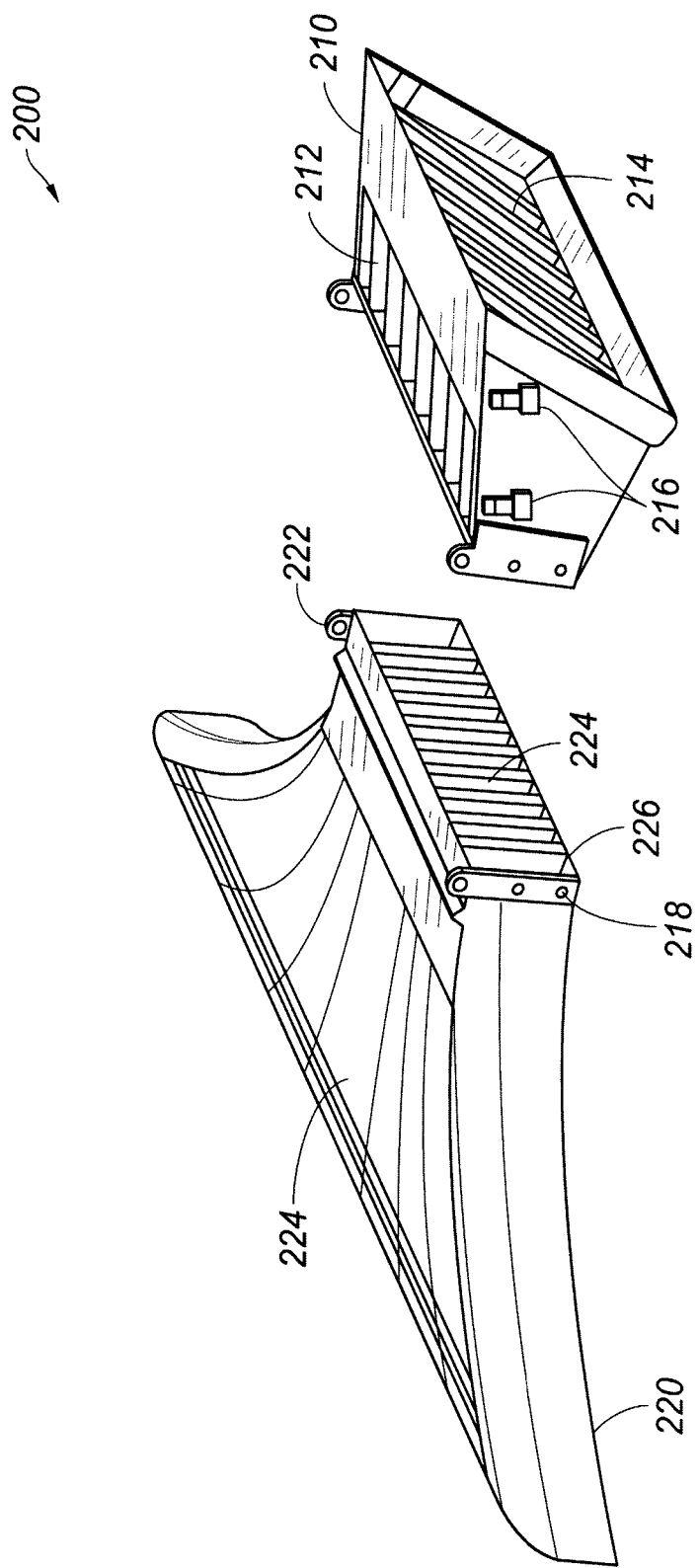

FIGS. 5A-B are illustrations of an embodiment of a spreader for a gatebox. Molded spreader 200 may include one or more of throat assembly 210, material intake 212, air intake 214, connectors 216, locking bolts 218, fan assembly 220, pivot bolt 222, vanes 224, and removable plate 226. In certain embodiments, molded spreader 200 receives air and material through throat assembly 210 where the received air moves the material through vanes 224 of fan assembly 220 and out of molded spreader 200 to control the distribution pattern of material released from gatebox 100. Any portion of molded spreader 200 may be comprised of a molded material such as plastic (e.g., acrylonitrile butadiene styrene (ABS) plastic), polymer, or composite material (e.g., fiberglass, plastic, or polymer reinforced with another material). The molded material may be molded in any suitable fashion.

Throat assembly 210 represents a component of molded spreader 200 that may be operable to connect to gatebox 100, aircraft 300, and/or fan assembly 220. In certain embodiments, throat assembly 210 can be quickly disconnected from fan assembly 220, for example, to change or repair a broken fan assembly 220, to exchange one type of fan assembly 220 for another type of fan assembly 220 with different spreading or aerodynamic characteristics, to clean fan assembly 220 or throat assembly 210, or any other suitable purpose. Throat assembly 210 may include one or more of material intake 212, air intake 214, connectors 216, locking bolts 218, and pivot bolt 222.

Material intake 212 represents a portion of molded spreader 200 operable to receive material from gatebox 100. In the illustrated embodiment, material intake 212 includes a number of dividers. These dividers may correspond to the different vanes 224 in fan assembly 220 and/or the different dividers in air intake 212. In an embodiment, as molded spreader 200 receives material from gatebox 100 at material intake 212, material flows over the dividers and into vanes 224 of fan assembly 220. Material intake 212 may be located on any suitable portion of molded spreader 200, including throat assembly 210 and fan assembly 220.

Air intake 214 represents a portion of molded spreader 200 operable to intake airflow while aircraft 300 connected to spreader 200 is flying. In certain embodiments, air intake 214 includes a number of dividers. These dividers may correspond to vanes 224 of molded spreader 200 and/or the dividers of material intake 212. In an embodiment, as aircraft 300 connected to spreader 200 is flying, air flows into air intake 214 through vanes 224 and out the rear of fan assembly 224 of spreader 200. Material received from gatebox 100 through material intake 212 may be carried by the airflow captured by air intake 214 and carried through vanes 224 of molded spreader 200. Air intake 214 may be located on any suitable portion of molded spreader 200, including throat assembly 210 and fan assembly 220, and molded spreader 200 may include multiple air intakes 214.

Connectors 216 represent components of molded spreader 200 operable to connect molded spreader 200 to gatebox 100 or aircraft 300. In certain embodiments, connectors 216 are over-center latches, however, connectors 216 may represent any suitable component operable to hold molded spreader 200 to gatebox 100 or aircraft 300. Connectors 216 may be quick-release connectors operable to quickly detach molded spreader 200 from gatebox 100 or aircraft 300.

Locking bolts 218 represent components operable to couple throat assembly 210 of molded spreader 200 to fan assembly 220 of molded spreader 200. In certain embodiments, locking bolts 218 are bolts that feed through openings in fan assembly 220 and throat assembly 210 to couple them together. However, locking bolts 218 may represent any suitable component operable to connect fan assembly 220 to throat assembly 210. Locking bolts 218 may be quickly and easily removed to remove fan assembly 220 from throat assembly 210. In an embodiment, locking bolts 218 can be removed to allow fan assembly 220 to be disconnected from throat assembly 210 without disconnecting throat assembly 210 from gatebox 100 or aircraft 300. For example, fan assembly 220 may be removed to change or repair a broken fan assembly 220, to exchange one type of fan assembly 220 for another type of fan assembly 220 with different spreading or aerodynamic characteristics, to clean fan assembly 220 or throat assembly 210, or any other suitable purpose.

Pivot bolts 222 represent components of molded spreader operable to adjust the angle of fan assembly 220 with respect to throat assembly 210, gatebox 100, and/or aircraft 300. Changing the angle of fan assembly 210 may change the distribution pattern of material flowing through molded spreader 200 and may avoid a buildup of material on aircraft 300 and abrasive wear on the fuselage of aircraft 300 from the impact of material. In certain embodiments, pivot bolts 222 are bolts that allow the angle of fan assembly 220 to be adjusted by pivoting on pivot bolts 222, however, pivot bolts 222 may represent any suitable component operable to facilitate the adjustment of the angle of fan assembly 220 with respect to throat assembly 210, gatebox 100, and/or aircraft 300.

Fan assembly 220 represents a component of molded spreader 200 that is operable to direct the flow of material received by molded spreader 200 from gatebox 100. In certain embodiments, fan assembly 220 is comprised of a molded material (e.g., plastic, polymer, or fiberglass). The molded material may reduce the weight of fan assembly 220 and molded spreader 200 compared to spreaders comprised of sheet metal. In certain embodiments, because fan assembly 220 is constructed of a molded plastic material, it experiences fewer incidences of cracks, fractures, and breaks than sheet metal spreaders. Fan assembly 220 may have any suitable number of vanes 224 (e.g., 8 or 10), any suitable spread pattern, and may have any suitable aerodynamic body. In certain embodiments, multiple different fan assemblies 220 may be compatible with throat assembly 210 and fan assemblies 220 with different numbers of vanes 224, spread patterns, or aerodynamic shapes can be connected to throat assembly 210. Fan assembly 220 may include one or more of vanes 224 and removable plate 226.

Vanes 224 represent compartments of fan assembly 220 that transport airflow and received material through fan assembly 220. Vanes 224 may correspond to dividers in material intake 212 and/or air intake 214. Dividers in throat assembly 210 may straighten the direction of airflow through spreader 200 and reduce aerodynamic disturbances in throat assembly 210 prior to the injection of material from gatebox 100. In an embodiment, vanes 224 of fan assembly 220 have smooth curved surfaces that eliminate the corners and ridges found in vanes 224 made from sheet metal that eject material from vanes 224 in defined streams along each vane which creates an uneven spread pattern. Vanes 224 may need to be cleaned less often than vanes of sheet metal spreaders. Vanes 224 may be individually molded and then overlapped and molded with other vanes 224. Vanes 224 will be discussed in more detail below with respect to FIG. 6.

Removable plate 226 represents a portion of fan assembly 220 that is operable to be removed, for example, to allow for cleaning or repair of vanes 224. In certain embodiments, removable plate 226 is comprised of a molded material (e.g., plastic or polymer), sheet metal, or other suitable material. Removable plate 226 may be connected to fan assembly 220 in any suitable fashion, for example, quick release latches or bolts. In certain embodiments, removable plate 226 is located on the bottom of fan assembly 220, however, removable plate that may be located in any suitable portion of fan assembly 220 or spreader 200.

Modifications, additions, or omissions may be made to molded spreader 200. Molded spreader 200 may include more, fewer, or other components. Molded spreader 200 may be used with any suitable gatebox, including sliding door gatebox 100 or other non-sliding door gatebox.

Figure 6:
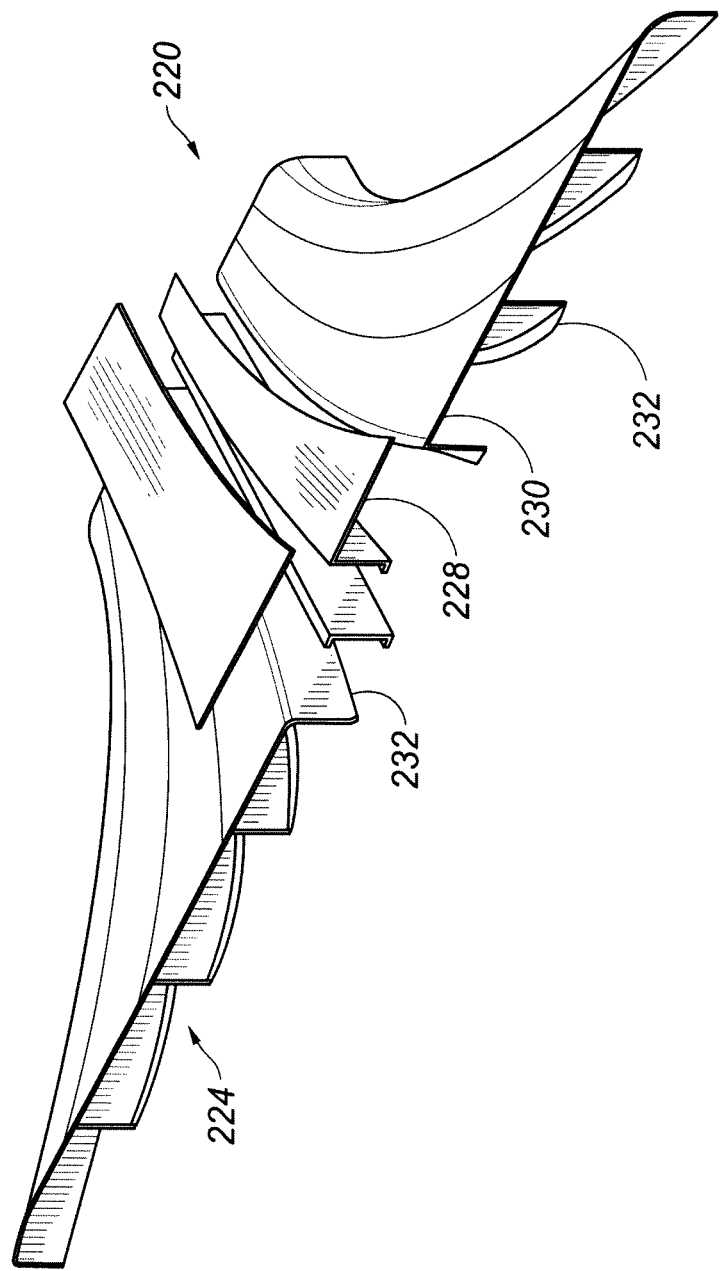
FIG. 6 is an illustration of an embodiment of the vanes of a fan assembly of a spreader for a gatebox.

FIG. 6 is an illustration of an embodiment of vanes 224 of a fan assembly of a spreader for a gatebox. In the illustrated embodiment, vanes 224 include horizontal plates 228 and vertical plates 230. Vertical plates 230 may include one or more horizontal lips 232. In an embodiment, horizontal plates 228 are molded to horizontal lips 232 of vertical plates 230, thereby forming vanes 224. The bottom of vanes 224 may be formed by removable plate 226 (not pictured). Horizontal plates 228 and vertical plates 230 may be comprised of a molded material, such as plastic, polymer, composite material (e.g., fiberglass, plastic, or polymer reinforced with another material), or any other suitable material. Any parts of the fan assembly 220 may be coated or covered by a wearable or sacrificial material which may be reapplied or maintained by removing of the removable plate 226. Sacrificial materials represent any material that can be applied to fan assembly 220 to absorb damage and protect fan assembly 220. Sacrificial materials include foam, plastic, polymer, fiberglass, or any other material that may coat fan assembly 220 and protect it from damage or wear.

Modifications, additions, or omissions may be made to fan assembly 220 or vanes 224. Fan assembly 220 or vanes 224 may include more, fewer, or other components. In certain embodiments, fan assembly 220 or vanes 224 may be a single molded component (e.g., formed from a single mold) or may be formed by any combination of discrete components where one or more of the discrete components may be molded.

Certain embodiments of the present disclosure may include some, all, or none of the following advantages. One or more other technical advantages may be readily apparent to those skilled in the art from the figures, descriptions, and claims included herein.

In an embodiment, a spreader comprising a molded plastic body weighs less than existing sheet metal spreaders, thereby reducing the weight required for an aircraft to carry a spreader and reducing the resources required to attach or remove a spreader.

In another embodiment, a spreader comprising curved molded vanes prevents the build up of material, thereby preventing disruption of the spread pattern caused by obstructed vanes.

In yet another embodiment, a spreader with a detachable plate allows the vanes of the spreader to be maintained and repaired.

In still yet another embodiment, a spreader comprises a fan assembly that detachably connects to a throat assembly, thereby allowing different fan assemblies with different vane numbers, compositions, and spread patterns to be connected to a throat assembly of a spreader.

In a further embodiment, a spreader comprises adjustment mechanisms that change the angle of the spreader with respect to a gatebox, thereby allowing greater control over the spread pattern, prevention of buildup of material along the bottom of an aircraft, and reduction in the effect of abrasive wear from material impacting the aircraft.

What is claimed is:

1. A spreader for an aircraft, comprising:
   a throat assembly operable to couple to a gatebox, the throat assembly comprising:
      an air intake portion operable to direct airflow into the spreader;
      a material intake portion operable to receive material released from the gatebox;
   a fan-shaped spreader assembly comprising a plurality of vanes that divide the fan-shaped spreader assembly into a plurality of compartments, wherein the vanes comprise one or more vertical plates, each with a horizontal lip, and one or more horizontal plates molded to the horizontal lips, the one or more vertical plates comprised of a molded material; and
   a connection mechanism operable to couple the fan-shaped spreader assembly to the throat assembly.

2. The spreader of claim 1, wherein the throat assembly further comprises over-center latches operable to couple the throat assembly to the gatebox.

3. The spreader of claim 1, further comprising an adjustment mechanism operable to adjust the vertical angle between the fan-shaped spreader assembly and the throat assembly.

4. The spreader of claim 1, wherein the throat assembly is operable to detachably connect to a plurality of fan-shaped spreader assemblies.

5. The spreader of claim 1, wherein the connection mechanism is at least one from the set comprising: bolts, fasteners, latches, and clips.

6. The spreader of claim 1, wherein the material intake is located downstream of the air intake and upstream of the fan-shaped spreader assembly.

7. The spreader of claim 1, wherein the fan-shaped spreader assembly includes a removable plate that exposes the interior of one or more vanes when removed.

8. The spreader of claim 1, wherein the fan-shaped spreader assembly includes a plurality of vanes.

9. The spreader of claim 1, wherein one or more vanes of the fan-shaped spreader assembly are coated with a sacrificial material.

10. The spreader of claim 1, wherein the molded material is comprised of at least one from the set comprising plastic, polymer, and fiberglass.

11. A system for spreading material from an aircraft, comprising:
a spreader comprising:
a throat assembly operable to couple to a gatebox, the throat assembly comprising:
an air intake portion operable to direct airflow into the spreader;
a material intake portion operable to receive material released from the gatebox;

a fan-shaped spreader assembly comprising a plurality of vanes that divide the fan-shaped spreader assembly into a plurality of compartments, wherein the vanes comprise one or more vertical plates, each with a horizontal lip, and one or more horizontal plates molded to the horizontal lips, the one or more vertical plates comprised of a molded material; and a connection mechanism operable to couple the fan-shaped spreader assembly to the throat assembly.

12. The system of claim 11, wherein the throat assembly further comprises over-center latches operable to couple the throat assembly to the gatebox.

13. The system of claim 11, further comprising an adjustment mechanism operable to adjust the vertical angle between the fan-shaped spreader assembly and the throat assembly.

14. The system of claim 11, wherein the throat assembly is operable to detachably connect to a plurality of fan-shaped spreader assemblies.

15. The system of claim 11, wherein the connection mechanism is at least one from the set comprising: bolts, fasteners, latches, and clips.

16. The system of claim 11, wherein the material intake is located downstream of the air intake and upstream of the fan-shaped spreader assembly.

17. The system of claim 11, wherein the fan-shaped spreader assembly includes a removable plate that exposes the interior of one or more vanes when removed.

18. The system of claim 11, wherein the fan-shaped spreader assembly includes a plurality of vanes.

19. The system of claim 11, wherein one or more vanes of the fan-shaped spreader assembly are coated with a sacrificial material.

20. The system of claim 11, wherein the molded material is comprised of at least one from the set comprising plastic, polymer, and fiberglass.

* * * * *